US012615678B2

(12) United States Patent
Tsuji

(10) Patent No.: US 12,615,678 B2
(45) Date of Patent: Apr. 28, 2026

(54) TERMINAL, NON-TRANSITORY COMPUTER-READABLE STORAGE MEDIUM STORING COMPUTER-READABLE INSTRUCTIONS FOR TERMINAL, AND METHOD IMPLEMENTABLE BY TERMINAL

(71) Applicant: Brother Kogyo Kabushiki Kaisha, Nagoya (JP)

(72) Inventor: Ryoya Tsuji, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 383 days.

(21) Appl. No.: 18/184,105

(22) Filed: Mar. 15, 2023

(65) Prior Publication Data

US 2024/0314865 A1 Sep. 19, 2024

(30) Foreign Application Priority Data

Mar. 13, 2023 (JP) ................................. 2023-038498

(51) Int. Cl.
H04W 76/15 (2018.01)
H04W 48/10 (2009.01)
H04W 76/12 (2018.01)
(52) U.S. Cl.
CPC ........... H04W 76/15 (2018.02); H04W 48/10 (2013.01); H04W 76/12 (2018.02)

(58) Field of Classification Search
CPC ...... H04W 76/15; H04W 76/12; H04W 48/10
See application file for complete search history.

(56) References Cited

U.S. PATENT DOCUMENTS

2017/0005876 A1 1/2017 Shibata
2018/0225073 A1* 8/2018 Nonoyama ........... H04W 76/19

FOREIGN PATENT DOCUMENTS

JP 2017-017601 A 1/2017

\* cited by examiner

*Primary Examiner* — Noel R Beharry
(74) *Attorney, Agent, or Firm* — Scully, Scott, Murphy & Presser, P.C.

(57) ABSTRACT

A terminal includes a controller configured to perform: receiving, via a first interface, identification information for identifying a communication device; in response to receiving the identification information, transmitting a first request signal to the communication device via a second interface, the first request signal including first destination information generated based on the identification information; in response to receiving a first response signal as a response to the first request signal, establishing a first wireless connection between the terminal and the communication device; and in response to not receiving the first response signal as a response to the first request signal, causing the output unit to output specific information, the specific information indicating a request for performance of a specific operation on the communication device, the specific operation being for causing the communication device to serve as a parent station in a wireless network.

16 Claims, 6 Drawing Sheets

(CASE A)

(SUBSEQUENT TO FIG. 2)

(SUBSEQUENT TO FIG. 3)

(CASE B)

(CASE C)

TERMINAL, NON-TRANSITORY COMPUTER-READABLE STORAGE MEDIUM STORING COMPUTER-READABLE INSTRUCTIONS FOR TERMINAL, AND METHOD IMPLEMENTABLE BY TERMINAL

This application claims priority from Japanese Patent Application No. 2023-038498 filed on Mar. 13, 2023. The entire content of the priority application is incorporated herein by reference.

BACKGROUND ART

A known communication system includes a printer and a terminal. If the terminal receives a Probe Response signal from the printer in response to transmission of a Probe Request signal to the printer, the terminal establishes a Soft AP connection with the printer.

DESCRIPTION

Nevertheless, no consideration has been given to a case where the terminal does not receive the Probe Response signal from the printer in the known communication system.

Aspects of the disclosure provide a technique for establishing a wireless connection between a terminal and a communication device although the terminal does not receive a first response signal from the communication device.

A terminal according to an aspect of the disclosure may include a first interface, a second interface configured to enable the terminal to perform wireless communication, the second interface being different from the first interface, an output unit and a controller. The controller is configured to perform: receiving, via the first interface, identification information for identifying a communication device; in response to receiving the identification information, transmitting a first request signal to the communication device via the second interface, the first request signal including first destination information generated based on the identification information; in response to receiving a first response signal as a response to the first request signal from the communication device via the second interface, establishing, via the second interface, a first wireless connection between the terminal and the communication device; and in response to not receiving the first response signal as a response to the first request signal from the communication device, causing the output unit to output specific information, the specific information indicating a request for performance of a specific operation on the communication device, the specific operation being for causing the communication device to serve as a parent station in a wireless network.

According to the above configuration, the terminal causes the output unit to output the specific information if the terminal does not receive the first response signal from the communication device in response to transmitting the first request signal to the communication device. A user may thus perform the specific operation on the communication device in accordance with the specific information, thereby causing the communication device to serve as a parent station in the wireless network. In a case where the communication device serves as a parent station, a wireless connection may be established between the terminal and the communication device. That is, the wireless connection between the terminal and the communication device may also be established if the terminal does not receive the first response signal from the communication device.

A computer program for implementing the above terminal, a non-transitory computer-readable storage medium storing the computer program, and a method to be implemented by the above terminal may have novelty and utility. Further, a communication system including the terminal and the communication device may have novelty and utility.

CONFIGURATION OF COMMUNICATION SYSTEM 2; FIG. 1

Figure 1:
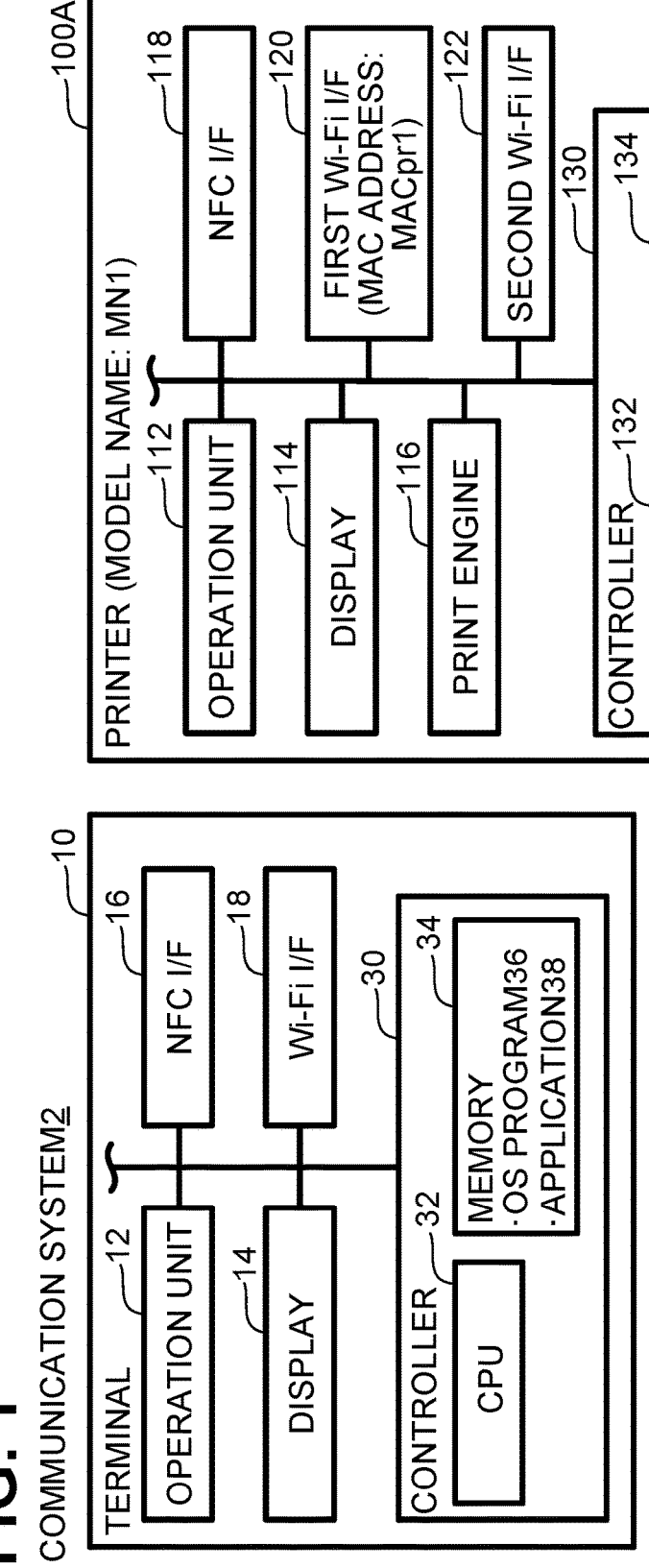
FIG. 1 is a configuration of a communication system.

As illustrated in FIG. 1, a communication system 2 includes a terminal 10, a printer 100A, a printer 100B, and an access point 200. Hereinafter, an access point is referred to as an "AP".

Configuration of Terminal 10

The terminal 10 may be a mobile device such as a mobile phone, a smartphone, a PDA, a tablet PC, or a laptop PC. In other embodiments, for example, the terminal 10 may be a stationary PC. The terminal 10 includes an operation unit 12, a display unit 14, a near field communication (NFC) interface 16, a Wi-Fi interface 18, and a controller 30. Hereinafter, an interface is referred to as an "I/F".

The operation unit 12 is an I/F that enables a user to enter various kinds of information to the terminal 10, and includes, for example, a touch screen, physical buttons, or both. The display unit 14 includes a display for displaying various kinds of information.

The NFC I/F 16 is configured to perform communication in accordance with an NFC scheme. Hereinafter, communication performed in accordance with the NFC scheme is referred to as "NFC communication". The NFC scheme is a wireless communication scheme based on an international standard, for example, ISO/IEC 14443, 15693, or 18092.

The Wi-Fi I/F 18 is configured to perform communication in accordance with a Wi-Fi scheme. Hereinafter, communication performed in accordance with the Wi-Fi scheme is referred to as "Wi-Fi communication". The Wi-Fi scheme is a wireless communication scheme based on, for example, the Institute of Electrical and Electronics Engineers, Inc. (IEEE) 802.11 standard and an IEEE 802.11 family standard. The family standard is, for example, IEEE 802.11a, 802.11b, 802.11g, 802.11n, or 802.11ac.

Hereinafter, differences between the NFC I/F 16 and the Wi-Fi I/F 18 will be described. A communication speed of Wi-Fi communication via the Wi-Fi I/F 18 is faster than a communication speed of NFC communication via the NFC I/F 16. Specifically, for example, a maximum communication speed of Wi-Fi communication is 600 Mbps. A maximum communication speed of NFC communication is 424 Kbps. Frequency of a carrier wave in Wi-Fi communication is different from frequency of a carrier wave in NFC communication. Specifically, frequency of a carrier wave in Wi-Fi communication is, for example, a 1.0 GHz band, a 2.4 GHz band, a 5.0 GHz band, or a 6.0 GHz band. Frequency of a carrier wave in NFC communication is, for example, a 13.56 MHz band. A communication range of Wi-Fi communication is greater than a communication range of NFC communication. Specifically, for example, a maximum communication range of Wi-Fi communication is 100 m. A maximum communication range of NFC communication is 10 cm.

The controller 30 includes a CPU 32 and a memory 34. The memory 34 stores an operating system (OS) program 36 and an application program 38. The CPU 32 executes various processing in accordance with the OS program 36 and the application program 38 stored in the memory 34. The memory 34 may be, for example, a read-only memory (ROM) or a random-access memory (RAM). The OS program 36 realizes basic operations of the terminal 10. The application program 38 causes the terminal 10 and the printer 100A or the terminal 10 and the printer 100B to establish a wireless connection in accordance with the Wi-Fi scheme. Thereafter, the application program 38 causes the printer 100A and the AP 200 or the printer 100B and the AP 200 to establish a wireless connection therebetween in accordance with the Wi-Fi scheme. Thereafter, the application program 38 causes the printer 100A or the printer 100B to perform printing. Hereinafter, a wireless connection in accordance with the Wi-Fi scheme is referred to as a "Wi-Fi connection". The OS program 36 is referred to as an "OS 36". The application program 38 is referred to as an "application 38". The application 38 is downloaded from a particular server on the Internet and installed on the terminal 10. The particular server is provided by a vendor of the OS program 36. Nevertheless, in other embodiments, for example, the server may be provided by the vendor of the printer 100A or the printer 100B.

Configuration of Printers 100A and 100B

The printer 100A is capable of performing a printing function, and may be, for example, a peripheral device for the terminal 10. In other embodiments, for example, the printer 100A may be a multifunction device capable of performing one or more other functions such as a scanning function or a facsimile function in addition to the printing function. The printer 100A has a model name "MN1". The printer 100A includes an operation unit 112, a display unit 114, a print engine 116, an NFC I/F 118, a first Wi-Fi I/F 120, a second Wi-Fi I/F 122, and a controller 130.

The operation unit 112 is an I/F that enables the user to enter various kinds of information to the printer 100A, and includes, for example, a touch screen, physical buttons, or both. The operation unit 112 includes a Wi-Fi button for causing the printer 100A to serve as a normal software access point (Soft AP). The display unit 114 includes a display for displaying various kinds of information. The print engine 116 includes, for example, an inkjet printing mechanism or a laser printing mechanism.

The NFC I/F 118 has the same configuration as the NFC I/F 16 of the terminal 10. The first Wi-Fi I/F 120 and the second Wi-Fi I/F 122 have the same configuration as the Wi-Fi I/F 18 of the terminal 10. A MAC address "MACpr1" is assigned to the first Wi-Fi I/F 120.

The printer 100A supports a Soft AP function of IEEE 802.11 standard. In response to the Soft AP function of the printer 100A being enabled, the printer 100A starts serving as an AP in a specific wireless network. That is, the printer 100A serves as a parent station in the wireless network to which the printer 100A belongs. In this state, the printer 100A may establish a wireless connection with an external device. That is, the external device may participate as a child station in the wireless network in which the printer 100A serves as the parent station.

In this embodiment, two types of Soft APs will be disclosed. Specifically, a normal Soft AP and a hidden Soft AP will be disclosed. The normal Soft AP is configured to serve as an AP in a wireless network identified by a public SSID. The hidden Soft AP is configured to serve as an AP in a wireless network identified by a hidden SSID. In a case where the printer 100A serves as the normal Soft AP, the first Wi-Fi I/F 120 transmits a Probe Response to an external device in response to receiving, from the external device, a Probe Request in which the SSID for the normal Soft AP is not specified. In the state where the printer 100A serves as the normal Soft AP, the first Wi-Fi I/F 120 also transmits a Probe Response to an external device in response to receiving, from the external device, a Probe Request in which the SSID for the normal Soft AP is not specified. That is, in the case where the printer 100A serves as the normal Soft AP, the first Wi-Fi I/F 120 transmits the Probe Response to the external device in response to receiving the Probe Request regardless of whether the SSID is specified in the Probe Request received from the external device. In a case where the printer 100A serves as the hidden Soft AP, the first Wi-Fi I/F 120 transmits a Probe Response to the external device in response to receiving, from the external device, a Probe Request in which the SSID for the hidden Soft AP is specified. In a case where the printer 100A serves as the hidden Soft AP, the first Wi-Fi I/F 120 does not transmit a Probe Response to the external device in response to receiving, from the external device, a Probe Request in which the SSID for the hidden Soft AP is not specified. The SSID for the normal Soft AP is different from the SSID for the hidden Soft AP. The SSID for the normal Soft AP and the SSID for the hidden Soft AP are predetermined before shipment of the printer 100A. The printer 100A is configured to activate to serve as the hidden Soft AP in a case where the printer 100A is turned on for the first time after the printer 100A is shipped. The SSID for the normal Soft AP for identifying the printer 100B is different from the SSID for the hidden Soft AP for identifying the printer 100B. The SSID for the normal Soft AP and the SSID for the hidden Soft AP are predetermined at the time of shipment of the printer 100B. The printer 100B is configured to activate as the hidden Soft AP when the printer 100B is powered on for the first time after the printer 100B is shipped.

The controller 130 includes a CPU 132 and a memory 134. The memory 134 stores a program 136. The CPU 132 executes various processing in accordance with the program 136. The memory 134 stores a model name "MN1" and a MAC address "MACpr1". In a case where the NFC I/F 118 is an independent I/F that is not capable of communicating with the CPU 132, the model name "MN1" and the MAC address "MACpr1" are stored in the NFC I/F 118. The memory 134 further stores a power flag. The power flag indicates either "ON" or "OFF". The power flag "ON" indicates that the power of the printer 100A has not yet been turned on after shipment. The power flag "OFF" indicates that the power of the printer 100A has been turned on at least once after shipment. The power flag is set to "ON" before shipment of the printer 100A.

The printer 100B has a model name "MN2". The printer 100B includes an operation unit similar to the operation unit 112 of the printer 100A except that the operation unit of the printer 100B does not include the Wi-Fi button. The printer 100B includes a display unit similar to the display unit 114 of the printer 100A except that the display unit of the printer 100B is capable of displaying a Wi-Fi icon. The Wi-Fi icon may be selected by the user to cause the printer 100B to serve as the normal Soft AP. The printer 100B has a configuration similar to that of the printer 100A except for the operation unit and the display unit. A MAC address "MACpr2" is assigned to the first Wi-Fi I/F 120B. The printer 100B stores a model name "MN2" and a MAC address "MACpr2" in a memory thereof. The power flag is set to "ON" before shipment of the printer 100B.

Configuration of AP200

The AP 200 serves as a parent station in a wireless network. The AP 200 stores an SSID "AP1" and a password "PW1" as information on a wireless network in which the AP 200 serves as a parent station.

Specific Cases

Referring to FIGS. 2 to 6, a description will be provided on specific Cases A, B, and C implemented by the communication system 2 according to the illustrative embodiment. In the description of FIGS. 2 to 6, the terminal 10, the application 38, the NFC I/F 16 or the Wi-Fi I/F 18 but not the CPU 32 is regarded as a doer of processing executed by the CPU 32. In the description of FIGS. 2 to 6, the printer 100A, the NFC I/F 118, the first Wi-Fi I/F 120 or the second Wi-Fi I/F 122 but not the CPU 132 is regarded as a doer of processing executed by the CPU 132.

Figure 2:
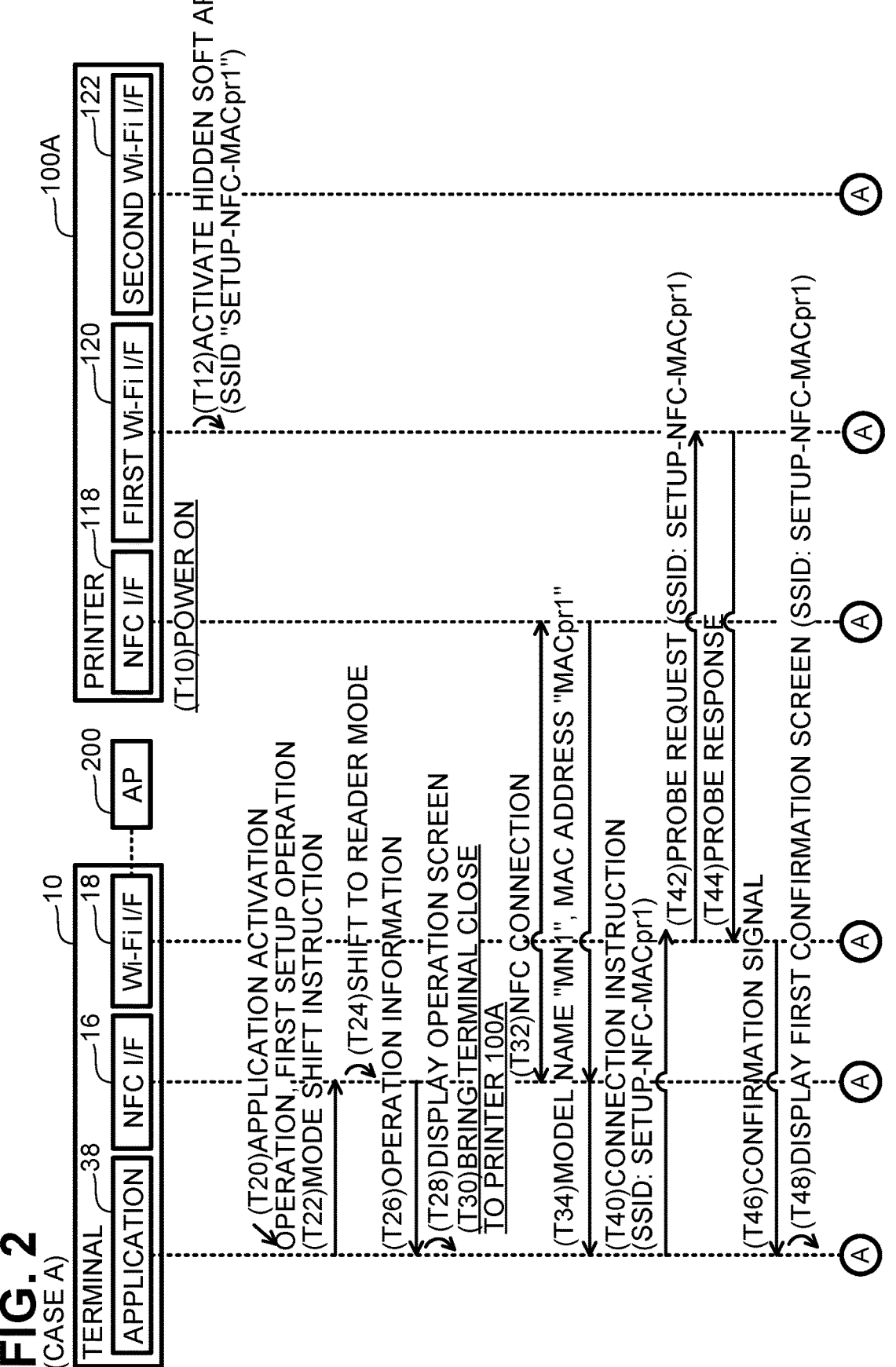
FIG. 2 is a sequence diagram of Case A in which a Wi-Fi connection is established between an access point (AP) and a printer serving as a hidden software AP (Soft AP).
Figure 3:
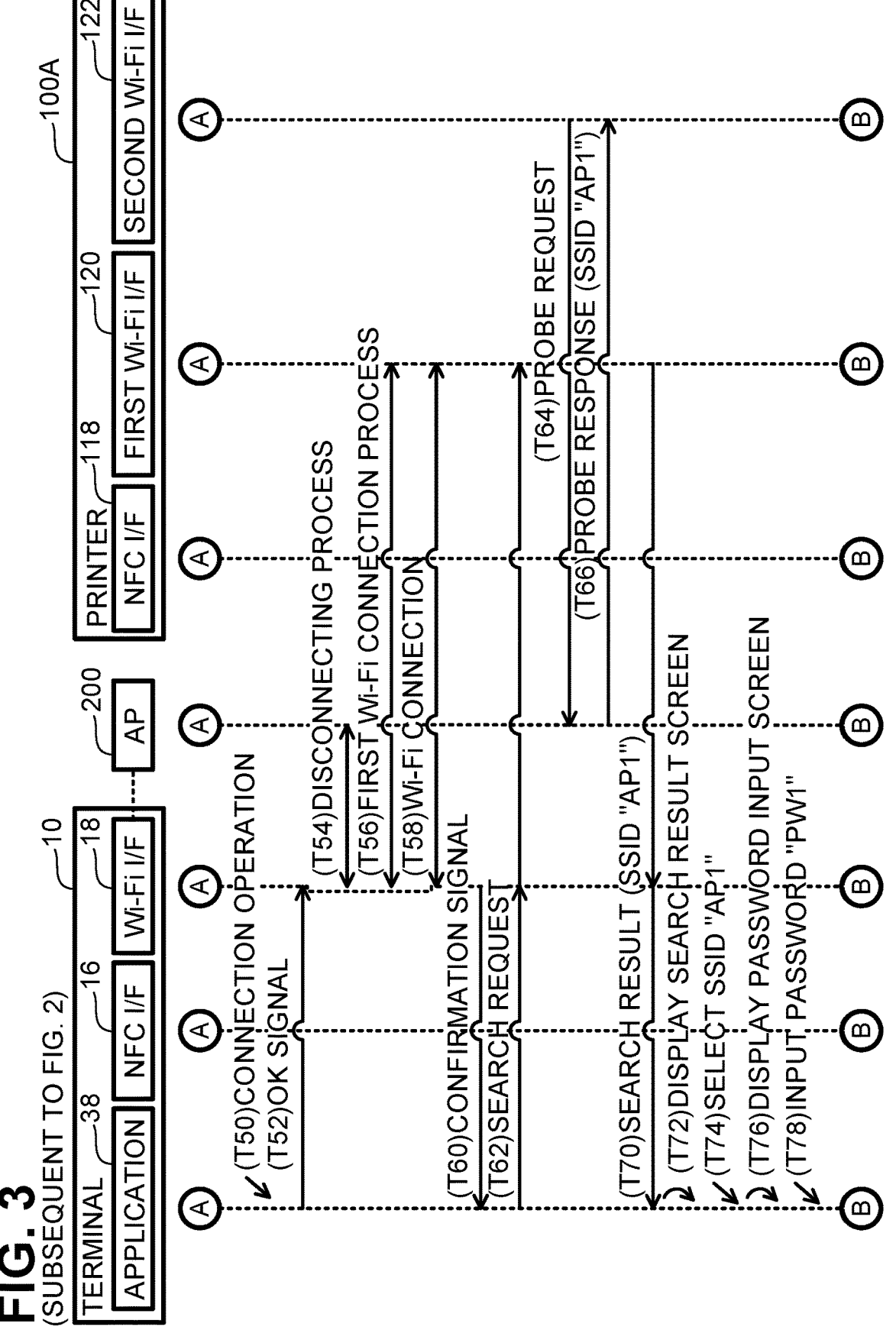
FIG. 3 is a sequence diagram of Case A continued from FIG. 2.
Figure 4:
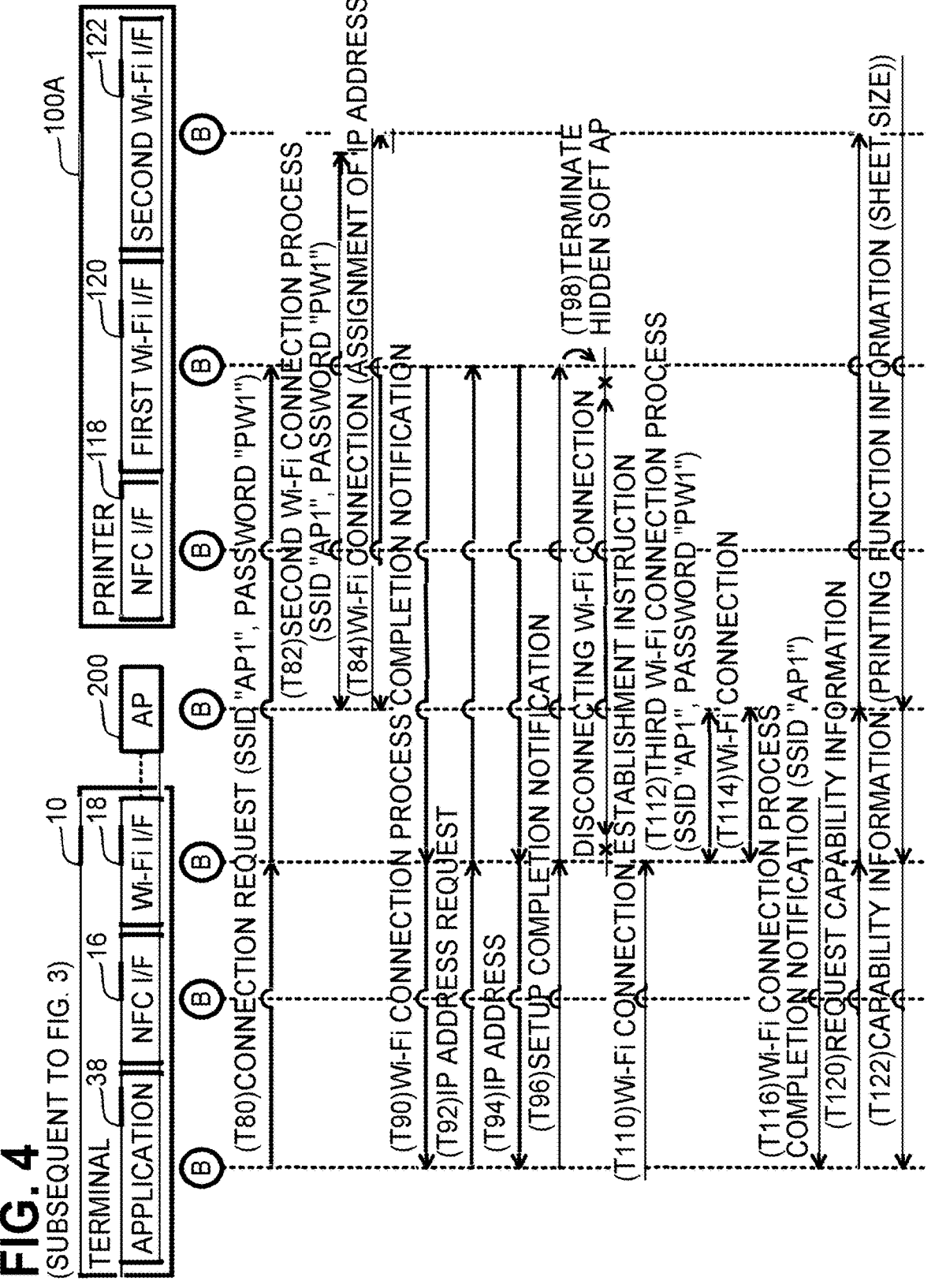
FIG. 4 is a sequence diagram of Case A continued from FIG. 3.

Case A; FIGS. 2 to 4

Referring to FIGS. 2 to 4, a description will be provided on Case A. In Case A, in response to the printer 100A activating to serve as the hidden Soft AP, a Wi-Fi connection is established between the printer 100A and the AP 200. In an initial state of Case A, that is, in a state before T10 is executed, a Wi-Fi connection has been established between the Wi-Fi I/F 18 of the terminal 10 and the AP 200. The printer 100A has not yet been turned on after the printer 100A is shipped and before step T10. That is, the power flag indicates "ON" in the memory 134.

In response to detecting a user operation for turning the power of the printer 100A on, in T10, the printer 100A turns its power on. In response to turning-on the power of the printer 100A, the NFC I/F 118 of the printer 100A operates in a Card Emulation mode (CE mode). In the CE mode, the NFC I/F 118 acts in the same manner as a "card" which is defined by the NFC Forum. Based on the determination that the power flag indicates "ON" in the memory 134, the printer 100A determines that the current power-on is the first power-on of the printer 100A after shipment. Thus, in T12, the printer 100A activates to serve as the hidden Soft AP. The printer 100A serving as the hidden Soft AP communicates with an external device via the first Wi-Fi I/F 120. In response to activating to serve as the hidden Soft AP, the printer 100A serves as a parent station in the wireless network. An SSID of the printer 100A serving as the hidden Soft AP includes the MAC-address "MACpr1" of the printer 100A, and is, for example, "SETUP-NFC-MACpr1". In T12, the printer 100A changes the power flag from "ON" to "OFF" in the memory 134.

In T20, the terminal 10 detects a user operation for activating the application 38. In response to detecting the user operation, the terminal 10 activates the application 38. The application 38 displays a home screen on the display unit 14. In T20, the application 38 detects another user operation that may be a first setup operation. The first setup operation is for executing a first setup in which a Wi-Fi connection is established between a printer and an AP by using an NFC connection. In T22, the application 38 provides a mode shift instruction to the NFC I/F 16. The mode shift instruction is a signal for causing the NFC I/F 16 to shift to a Reader mode of the NFC scheme. The Reader mode is for reading data from an NFC module operating in the CE mode. In the illustrative embodiment, the NFC I/F 16 operating in the Reader mode reads data from the NFC I/F 118 of the printer 100A operating in the CE mode.

In response to, in T22, receiving the mode shift instruction from the application 38, in T24, the NFC I/F 16 of the terminal 10 shifts to the Reader mode. In T26, the NFC I/F 16 provides operation information to the application 38.

In response to, in T26, receiving the operation information from the NFC I/F 16, in T28, the application 38 causes the display unit 14 to display an operation screen. The operation screen includes a message prompting the user to bring the terminal 10 close to a printer.

In T30, the user brings the terminal 10 close to the printer 100A. In response to a distance between the NFC I/F 16 of the terminal 10 and the NFC I/F 118 of the printer 100A becoming equal to or less than a certain distance, communication for establishing an NFC connection is performed between the NFC I/F 16 of the terminal 10 and the NFC I/F 118 of the printer 100A. Thus, in T32, the NFC connection is established between the terminal 10 and the printer 100A. In response to the NFC connection being established between the printer 100A and the terminal 10, the NFC I/F 118 of the printer 100A receives the model name "MN1" of the printer 100A and the MAC address "MACpr1" of the printer 100A from the memory 134. The NFC I/F 16 of the terminal 10 executes a process for reading the model name "MN1" and the MAC address "MACpr1" received by the NFC I/F 118 of the printer 100A. In T34, the application 38 thus receives the model name "MN1" and the MAC address "MACpr1" from the NFC I/F 118 of the printer 100A via the NFC I/F 16 of the terminal 10. The application 38 then generates an SSID "SETUP-NFC-MACpr1" including certain strings "SETUP" and "NFC" and the received MAC address "MACpr1". In T40, the application 38 provides a connection instruction including the generated SSID "SETUP-NFC-MACpr1" to the Wi-Fi I/F 18. The connection instruction is a signal for instructing the Wi-Fi I/F 18 to establish a Wi-Fi connection between the terminal 10 and the printer 100A.

In response to, in T40, receiving the connection instruction from the application 38, in T42, the Wi-Fi I/F 18 broadcasts a Probe Request including the SSID "SETUP-NFC-MACpr1" in the connection instruction.

In Case A, the printer 100A serves as the hidden Soft AP in the wireless network identified by the SSID "SETUP-NFC-MACpr1". Thus, in T44, the first Wi-Fi I/F 120 transmits, to the terminal 10, a Probe Response that is a response to the Probe Request.

In response to, in T44, receiving the Probe Response from the printer 100A, in T46, the Wi-Fi I/F 18 of the terminal 10 provides, to the application 38, a confirmation signal indicating that the Probe Response has been received.

In response to, in T46, receiving the confirmation signal from the Wi-Fi I/F 18, in T48, the application 38 causes the display unit 14 to display a first confirmation screen including SSID "SETUP-NFC-MACpr1". The first confirmation screen is for asking the user whether to permits the terminal 10 to participate in the wireless network using the SSID "SETUP-NFC-MACpr1". In response to, in T50 of FIG. 3, detecting an operation by the user indicating that the user permits the terminal 10 to participate in the wireless network using the SSID "SETUP-NFC-MACpr1", in T52, the application 38 provides an OK signal to the Wi-Fi I/F 18.

In response to, in T52, receiving the OK signal from the application 38, in T54, the Wi-Fi I/F 18 of the terminal 10 executes a disconnecting process for disconnecting the Wi-Fi connection established between the terminal 10 and the AP 200. Thus, the Wi-Fi connection between the terminal 10 and the AP 200 is disconnected. In T56, the Wi-Fi I/F 18 executes a first Wi-Fi connection process for establishing a Wi-Fi connection between the terminal 10 and the printer 100A. In the first Wi-Fi connection process, various communications such as a 4-way handshake are executed between the terminal 10 and the printer 100A. Accordingly, in T58, a Wi-Fi connection is established between the Wi-Fi I/F 18 of the terminal 10 and the first Wi-Fi I/F 120 of the printer 100A serving as the hidden Soft AP. Specifically, the terminal 10 participates, as a child station, in the wireless network in which the printer 100A serves as a parent station. In T60, the Wi-Fi I/F 18 provides, to the application 38, an establishment signal indicating that the Wi-Fi connection has been established.

As described above, the terminal 10 disconnects the Wi-Fi connection that has been established with the AP 200 before establishing another Wi-Fi connection with the printer 100A. This is because the Wi-Fi I/F 18 of the terminal 10 according to the illustrative embodiment is not capable of establishing two or more wireless connections at the same time. That is, in a state where the terminal 10 establishes a Wi-Fi connection with the AP 200, the terminal 10 is not capable of establishing another Wi-Fi connection with the printer 100A. Therefore, the terminal 10 needs to disconnect the Wi-Fi connection established with the printer 100A before establishing another Wi-Fi connection with the printer 100A.

In response to, in T60, receiving the establishment signal from the Wi-Fi I/F 18, in T62, the application 38 transmits a search request to the printer 100A via the Wi-Fi I/F 18. The search request is a signal for requesting the printer 100A to search for one or more APs in a communicable range of the printer 100A through a Wi-Fi communication.

In response to, in T62, the first Wi-Fi I/F 120 of the printer 100A receiving the search request from the terminal 10, the second Wi-Fi I/F 122 of the printer 100A broadcasts a Probe Request in which an SSID is not specified. The Probe Request is a signal for searching for one or more Aps in the communicable range of the printer 100A through a Wi-Fi connection. In this embodiment, in T66, the second Wi-Fi I/F 122 receives, from the AP 200, the Probe Response including the SSID "AP1". In response to receiving the Probe Response including the SSID "AP1", in T70, the first Wi-Fi I/F 120 transmits, to the terminal 10, a search result including the SSID "AP1".

In response to, in T70, receiving the search result from the printer 100A via the Wi-Fi I/F 18, in T72, the application 38 causes the display unit 14 to display a search result screen including the SSID "AP1". In response to, in T74, detecting a user selection of the SSID "AP1", in T76, the application 38 causes the display unit 14 to display a password entry screen. In response to, in T78, detecting a user entry of the password "PW1" on the password entry screen, in T80 of FIG. 4, the application 38 transmits, to the printer 100A, a connection request including the SSID "AP1" and the password "PW1" via the Wi-Fi I/F 18. After transmitting the connection request to the printer 100A in T80, the application 38 periodically transmits, to the printer 100A, an inquiry signal for inquiring whether a Wi-Fi connection based on the connection request has been established.

In response to, in T80, the first Wi-Fi I/F 120 of the printer 100A receiving the connection request from the terminal 10, in T82, a second Wi-Fi connection process is executed between the second Wi-Fi I/F 122 of the printer 100A and the AP 200. In the second Wi-Fi connection process, various communications such as a 4-way handshake are performed between the printer 100A and the AP 200. In the various communications in which the SSID "AP1" and the password "PW1" are used, the AP 200 performs authentication of the SSID "AP1" and the password "PW1". In response to successful authentication, in T84, a Wi-Fi connection is established between the second Wi-Fi I/F 122 of the printer 100A and the AP 200. In response to establishment of the Wi-Fi connection between the second Wi-Fi I/F 122 of the printer 100A and the AP 200, the AP 200 serving as a parent station assigns an IP address to the second Wi-Fi I/F 122 of the printer 100A serving as a child station. The printer 100A stores the assigned IP address in the memory 134. In response to receiving the inquiry signal from the terminal 10 after storing the IP address in the memory 134, in T90, the first Wi-Fi I/F 120 transmits a Wi-Fi connection process completion notification to the terminal 10. The Wi-Fi connection process completion notification indicates that the Wi-Fi connection has been established between the printer 100A and the AP 200.

In response to, in T90, receiving the Wi-Fi connection process completion notification from the printer 100A via the Wi-Fi I/F 18, in T92, the application 38 transmits an IP address request to the printer 100A via the Wi-Fi I/F 18. The IP address request is a signal for requesting the printer 100A to transmit the IP address of the Wi-Fi I/F 122 that has established the Wi-Fi connection with the AP 200.

In response to, in T92, receiving the IP address request from the terminal 10, the first Wi-Fi I/F 120 of the printer 100A reads the IP address that is assigned to the second Wi-Fi I/F 122 from the memory 134 of the printer 100A. In T94, the first Wi-Fi I/F 120 transmits the IP address to the terminal 10.

In response to, in T94, receiving the IP address from the printer 100A via the Wi-Fi I/F 18, in T96, the application 38 transmits a setup completion notification to the printer 100A via the Wi-Fi I/F 18. The setup completion notification is a signal for causing the printer 100A to stop serving as the hidden Soft AP.

In response to, in T96, the first Wi-Fi I/F 120 of the printer 100A receiving the setup completion notification from the terminal 10, in T98, the printer 100A stops serving as the hidden Soft AP. Accordingly, the Wi-Fi connection between the Wi-Fi I/F 18 of the terminal 10 and the first Wi-Fi I/F 120 of the printer 100A is disconnected.

In T110, the application 38 provides, to the Wi-Fi I/F 18, a Wi-Fi connection establishment instruction including the SSID "AP1" and the password "PW1".

In response to, in T110, receiving the Wi-Fi connection establishment instruction from the application 38, in T112, the Wi-Fi I/F 18 of the terminal 10 executes a third Wi-Fi connection process for establishing a Wi-Fi connection between the terminal 10 and the AP 200. Thus, in T114, the Wi-Fi connection is established between the Wi-Fi I/F 18 of the terminal 10 and the AP 200. The third Wi-Fi connection process is the same as the second Wi-Fi connection process of T82 except that a communication target of the AP 200 is the terminal 10 instead of the printer 100A. In T116, the Wi-Fi I/F 18 provides, to the application 38, a Wi-Fi connection process completion notification including the SSID "AP1".

In response to, in T116, receiving the Wi-Fi connection process completion notification from the Wi-Fi I/F 18, in T120, the application 38 transmits a capability information request to the printer 100A via the Wi-Fi I/F 18 and the AP 200. The capability information request includes the IP address received in T94. The IP address refers to a destination of the capability information request. The capability information request is a signal for requesting a particular device that is the destination device of the capability information request to transmit its capability information. The capability information indicates one or more functions executable by the destination device of the capability information request.

In response to, in T120, receiving the capability information request from the terminal 10 via the AP 200, in T122, the second Wi-Fi I/F 122 of the printer 100A transmits capability information to the terminal 10. The capability information includes print function information. In this illustrative embodiment, the print function information indicates one or more print settings that may be specified by the user for the printer 100A. The print function information includes, for example, a sheet size available in the printer 100A.

In response to, in T122, receiving the capability information from the printer 100A via the Wi-Fi I/F 18 and the AP 200, the application 38 stores the capability information in the memory 34. The application 38 may thus transmit print data to the printer 100A via the Wi-Fi I/F 18 and the AP 200 based on one or more print settings specified by the user among the one or more print settings indicated by the print capability information. Therefore, the user may cause the printer 100A to perform printing through the application 38.

As described above, in response to establishment of the Wi-Fi connection between the terminal 10 and the printer 100A (T58), the terminal 10 transmits, to the printer 100A, the SSID "AP1" and the password "PW1" via the Wi-Fi I/F 18. Thus, the printer 100A may establish a Wi-Fi connection with the AP 200 by using the SSID "AP1" and the password "PW1".

Figure 5:
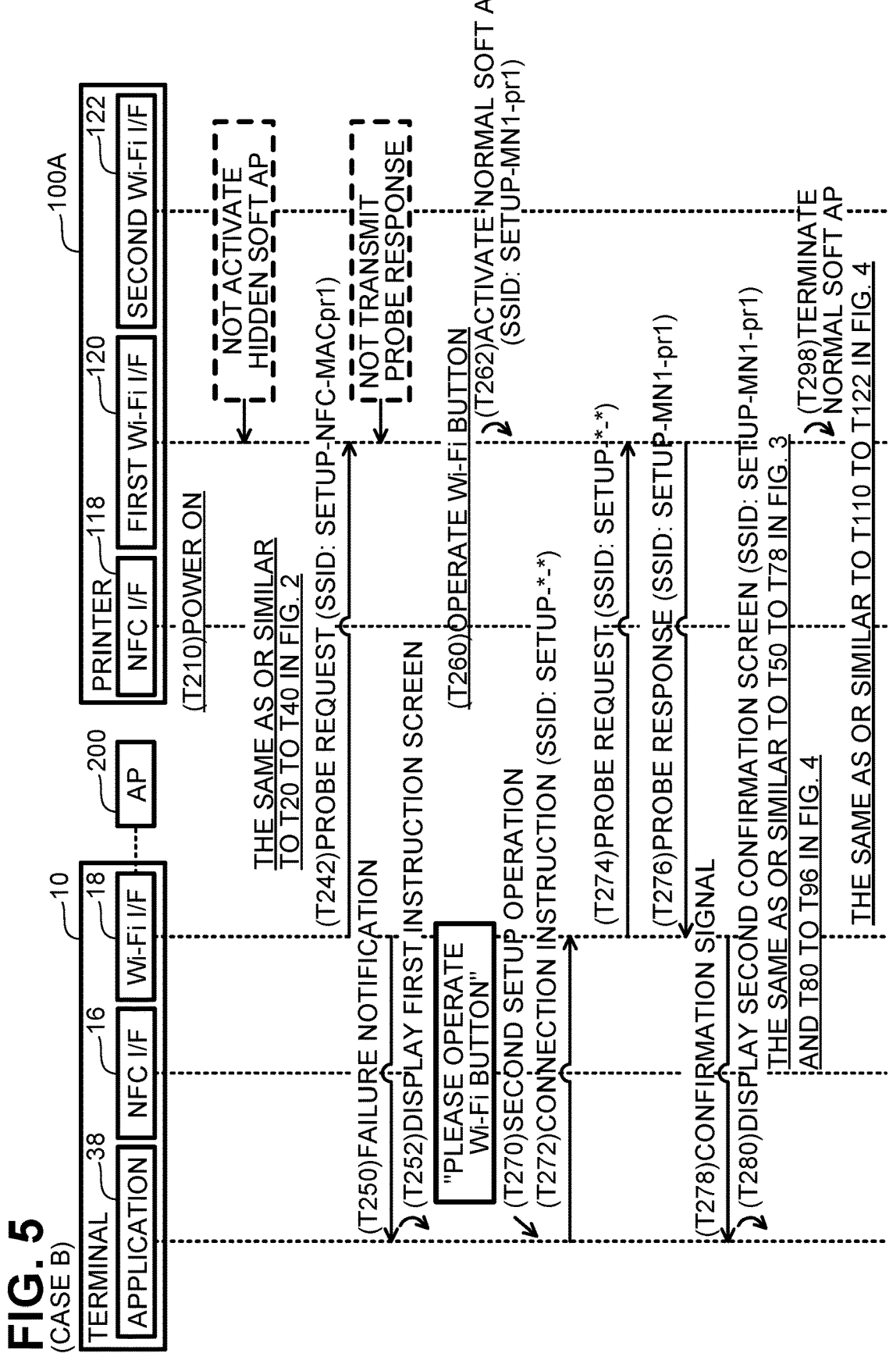
FIG. 5 is a sequence diagram of Case B in which a Wi-Fi connection is established between an AP and a printer serving as a normal Soft AP.

Case B; FIG. 5

Referring to FIG. 5, a description will be provided on Case B. In Case B, in response to the printer 100A activating to serve as the normal Soft AP, a Wi-Fi connection is established between the printer 100A and the AP 200. In an initial state of Case B, the power of the printer 100A has been turned off after T122 of Case A is executed. Thus, a Wi-Fi connection is not established between the printer 100A and the AP 200. In the initial state of Case B, however, a Wi-Fi connection has been established between the Wi-Fi I/F 18 of the terminal 10 and the AP 200.

In response to detecting a user operation for turning the power of the printer 100A on, in T210, the printer 100A turns its power on. In Case B, based on the determination that the power flag indicates "OFF" in the memory 134, the printer 100A determines that the current power-on in T210 executed in response to the user operation is the second or subsequent power-on after shipment. Based on the determination, the printer 100A activates without serving as the hidden Soft AP after activation. That is, the Soft AP function of the printer 100A remains disabled although the power of the printer 100A is turned on in T210.

Thereafter, the terminal 10 and the printer 100A each execute appropriate one or more processing that is the same as or similar to the processing executed in T20 to T40 in FIG. 2. In T242, the Wi-Fi I/F 18 broadcasts a Probe Request including the SSID "SETUP-NFC-MACpr1".

In Case B, the printer 100A does not serve as the Soft AP in the wireless network identified by the SSID "SETUP-NFC-MACpr1". Thus, in T242, the first Wi-Fi I/F 120 does not transmit, to the terminal 10, a Probe Response although the first Wi-Fi I/F 120 receives, from the terminal 10, the Probe Request including "SETUP-NFC-MACpr1".

In a case where the terminal 10 does not receive the Probe Response from the printer 100A after elapse of a certain time period since the Wi-Fi I/F 18 transmits the Probe Request to the printer 100A, the terminal 10 determines that a printer serving as the Soft AP in the wireless network identified by the SSID "SETUP-NFC-MACpr1" is not in the communicable range of the printer 100A through a Wi-Fi connection. In this case, in T250, the Wi-Fi I/F 18 provides a failure notification to the application 38. The failure notification indicates that the terminal 10 failed to establish a Wi-Fi connection with the printer 100A.

In response to, in T250, receiving the failure notification from the Wi-Fi I/F 18, the application 38 of the terminal 10 identifies the model name "MN1" of the printer 100A received via the NFC connection in T34 of FIG. 2. In T252, the application 38 causes the display unit 14 to display a first instruction screen for the model name "MN1". The first instruction screen includes a message prompting the user to operate the Wi-Fi button included in the operation unit 112 of the printer 100A. That is, the first instruction screen is for prompting the user to perform an operation for enabling the printer 100A to be a parent station in the wireless network.

In response to, in T260, detecting an operation of the Wi-Fi button by the user, in T262, the printer 100A activates to serve as the normal Soft AP. The wireless network formed by the printer 100A serving as the normal Soft AP is identified by the SSID "SETUP-MN1-pr1" including the model name "MN1" of the printer 100A. The string "SETUP" of the SSID is predetermined. The string "MN1" is a model name of the printer 100A. The string "pr1" is information identified based on the MAC address "MACpr1" of the printer 100A.

In T270, the application 38 detects a second setup operation performed by the user. The second setup operation is for executing a second setup in which a Wi-Fi connection is established between a printer and an AP without using an NFC connection. The application 38 generates an SSID "SETUP-*-*" including the predetermined string "SETUP". The symbol "*" in the SSID may be a wildcard indicating any number of letters. In T272, the application 38 provides a connection instruction including the generated SSID "SETUP-*-*" to the Wi-Fi I/F 18.

In response to, in T272, receiving the connection instruction from the application 38, in T274, the Wi-Fi I/F 18 broadcasts a Probe Request including the SSID "SETUP-*-*" in the connection instruction.

In Case B, the printer 100A serves as the Soft AP in the wireless network identified by the SSID "SETUP-MN1-pr1". Thus, in T276, the first Wi-Fi I/F 120 transmits, to the terminal 10, a Probe Response that is a response to the Probe Request. The Probe Response includes the SSID "SETUP-MN1-pr1".

In response to, in T276, receiving the Probe Response from the printer 100A, in T278, the Wi-Fi I/F 18 of the terminal 10 provides, to the application 38, a confirmation signal including the SSID "SETUP-MN1-pr1". The confirmation signal indicates that the Probe Response has been received by the Wi-Fi I/F 18.

In response to, in T278, receiving the confirmation signal from the Wi-Fi I/F 18, in T280, the application 38 causes the display unit 14 to display a second confirmation screen including the SSID "SETUP-MN1-pr1". The second confirmation screen is for asking the user whether to permit the terminal 10 to participate in the wireless network using the SSID "SETUP-MN1-pr1". Subsequent to T280, the terminal 10, the printer 100A and the AP 200 each execute appropriate one or more processing that is the same as or similar to the processing executed in T50 to T78 in FIGS. 3 and T80 to T96 in FIG. 4. Therefore, in the processing that is the same as or similar to the processing executed in T58 of FIG. 3, a Wi-Fi connection is established between the Wi-Fi I/F 18 of the terminal 10 and the first Wi-Fi I/F 120 of the printer 100A serving as the normal Soft AP. In the processing that is the same as or similar to the processing executed in T84 of FIG. 4, a Wi-Fi connection is established between the second Wi-Fi I/F 122 of the printer 100A and the AP 200. In T298, the printer 100A stops serving as the normal Soft AP. The Wi-Fi connection established between the Wi-Fi I/F 18 of the terminal 10 and the first Wi-Fi I/F 120 of the printer 100A is thus disconnected. Thereafter, the terminal 10, the printer 100A and the AP 200 each execute appropriate one or more processing that is the same as or similar to the processing executed in T110 to T122 of FIG. 4. Therefore, the application 38 may transmit print data to the printer 100A via the Wi-Fi I/F 18 and the AP 200. This may enable the user to cause the printer 100A to perform printing by through the application 38.

Effect of Case B; FIG. 5

In response to detecting the second setup operation performed by the user (T270 in FIG. 5) after displaying the first instruction screen on the display unit 14, the terminal 10 broadcasts the Probe Request including the SSID "SETUP-*-*" (T274). In response to receiving the Probe Response from the printer 100A (T276), the terminal 10 establishes a Wi-Fi connection with the printer 100A (processing that is the same as or similar to processing executed in T58 of FIG. 3). As described above, the terminal 10 may establish the Wi-Fi connection with the printer 100A although the terminal 10 does not receive, from the printer 100A, the Probe Response that is a response to the Probe Request including the SSID "SETUP-NFC-MACpr1".

Figure 6:
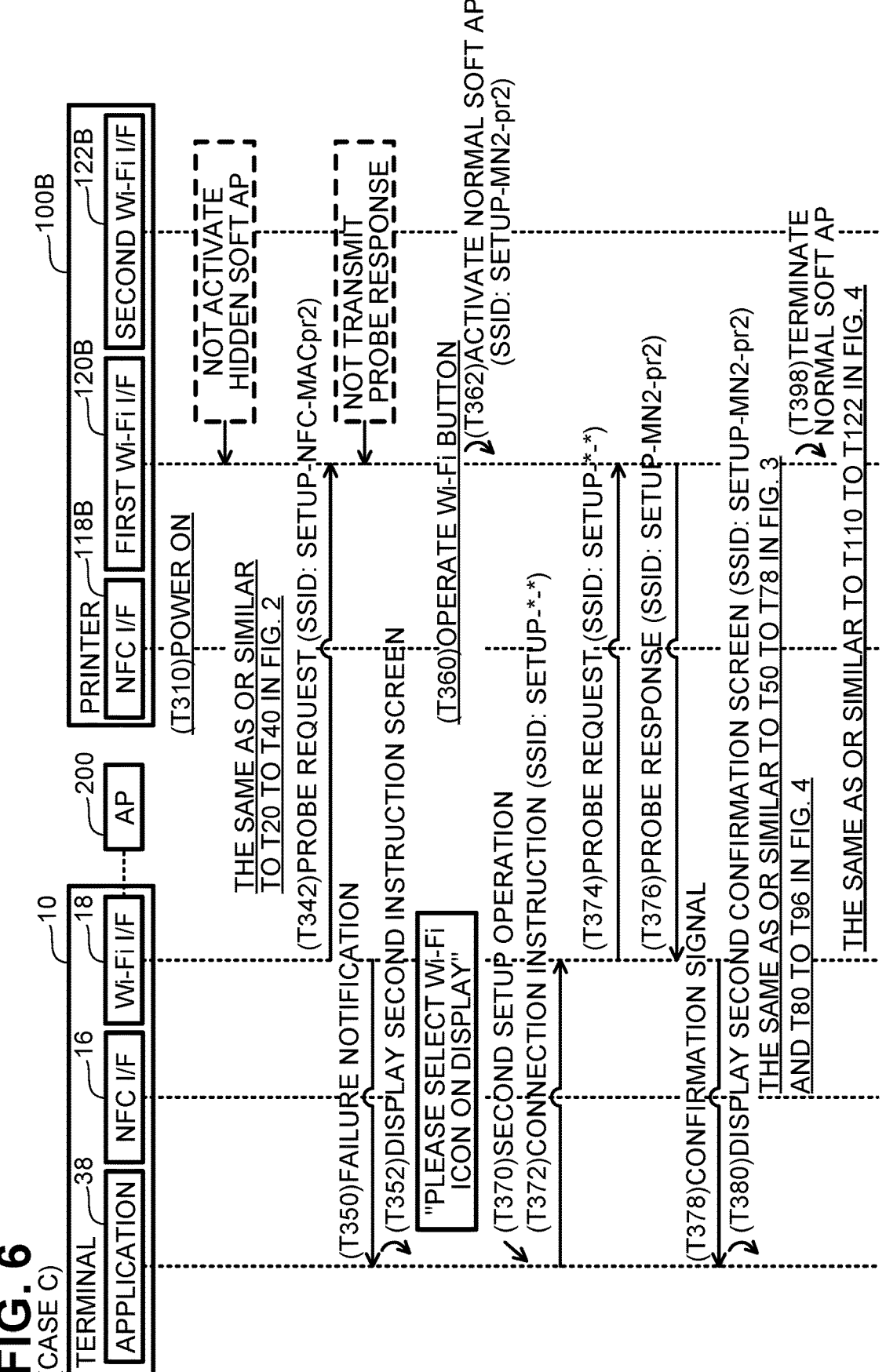
FIG. 6 is a sequence diagram of Case C in which a Wi-Fi connection is established between an AP and a printer serving as a normal Soft AP.

Case C; FIG. 6

Referring to FIG. 6, a description will be provided on Case C. In Case C, in response to the printer 100A activating to serve as the normal Soft AP, a Wi-Fi connection is established between the printer 100B and the AP 200. In an initial state of Case C, that is, in a state before T310 is executed, the power of the printer 100B has been turned off after a Wi-Fi connection is established between the printer 100B and the AP 200. In the initial state of Case C, while a Wi-Fi connection is not established between the printer 100A and the AP 200, a Wi-Fi connection has been established between the Wi-Fi I/F 18 of the terminal 10 and the AP 200. Further, the power flag indicates "OFF" in the memory of the printer 100B.

In response to detecting a user operation for turning the power of the printer 100B on, in T310, the printer 100B turns its power on. In Case C, based on the determination that the power flag indicates "OFF" in the memory of the printer 100B, the printer 100B determines that the current power-on in response to the user operation is the second or subsequent power-on after shipment. Thus, the printer 100B activates to serve as the hidden Soft AP.

Thereafter, the terminal 10 and the printer 100B each execute appropriate one or more processing that is the same as or similar to the processing executed in T20 to T40 in FIG. 2. In Case C, in the processing that is the same as or similar to the processing executed in T34, the application 38 receives the model name "MN2" and the MAC address "MACpr2" from the NFC I/F 118B of the printer 100B via the NFC I/F 16. The connection instruction transmitted in T40 includes the SSID "SETUP-NFC-MACpr2". In T342, the Wi-Fi I/F 18 broadcasts a Probe Request including the SSID "SETUP-NFC-MACpr2".

In Case C, the printer 100B does not serve as the Soft AP in the wireless network identified by the SSID "SETUP-NFC-MACpr2". Thus, in T342, the first Wi-Fi I/F 120B does not transmit, to the terminal 10, a Probe Response although the first Wi-Fi I/F 120B receives, from the terminal 10, the Probe Request including "SETUP-NFC-MACpr2".

T350 is the same as or similar to T250. In response to, in T350, receiving the failure notification from the Wi-Fi I/F 18, the application 38 identifies the model name "MN2" of the printer 100B. In T352, the application 38 causes the display unit 14 to display a second instruction screen for the model name "MN2". The second instruction screen includes a message prompting the user to perform an operation for selecting a Wi-Fi icon displayed on a display unit of the printer 100B. That is, the second instruction screen is for prompting the user to perform an operation for enabling the printer 100B to be a parent station in the wireless network. The model name "MN2" of the printer 100B is different from the model name "MN1" of the printer 100A. Accordingly, the second instruction screen is different from the first instruction screen.

In response to, in T360, detecting an operation of the Wi-Fi icon by the user, in T362, the printer 100B activates to serve as the normal Soft AP. The wireless network formed by the printer 100B serving as the normal Soft AP is identified by the SSID "SETUP-MN1-pr2" including the model name "MN2" of the printer 100B. The string "SETUP" of the SSID is predetermined. The string "MN2" is a model name of the printer 100B. The string "pr2" is information identified based on the MAC address "MACpr2" of the printer 100B.

T370 to T374 are the same as or similar to T270 to T274 in FIG. 5, respectively.

In Case C, the printer 100B serves as the Soft AP in the wireless network identified by the SSID "SETUP-MN1-pr2". Thus, in T376, the first Wi-Fi I/F 120B transmits, to the terminal 10, a Probe Response that is a response to the Probe Request. The Probe Response includes the SSID "SETUP-MN1-pr2". T378 is the same as or similar to T278 of FIG. 5.

In response to, in T378, receiving the confirmation signal from the Wi-Fi I/F 18, in T380, the application 38 causes the display unit 14 to display a second confirmation screen including the SSID "SETUP-MN1-pr2". Thereafter, the terminal 10, the printer 100B and the AP 200 each execute appropriate one or more processing that is the same as or similar to the processing executed in T50 to T78 in FIGS. 3 and T80 to T96 in FIG. 4. Therefore, in the processing that is the same as or similar to the processing executed in T58 of FIG. 3, a Wi-Fi connection is established between the Wi-Fi I/F 18 of the terminal 10 and the first Wi-Fi I/F 120B of the printer 100B serving as the normal Soft AP. In the processing that is the same as or similar to the processing executed in T84 of FIG. 4, a Wi-Fi connection is established between the second Wi-Fi I/F 122B of the printer 100B and the AP 200. In T398, the printer 100B stops serving as the normal Soft AP. The Wi-Fi connection established between the Wi-Fi I/F 18 of the terminal 10 and the first Wi-Fi I/F 120B of the printer 100B is thus disconnected. Thereafter, the terminal 10, the printer 100B and the AP 200 each execute appropriate one or more processing that is the same as or similar to the processing executed in T110 to T122 of FIG. 4. Therefore, the application 38 may transmit print data to the printer 100B via the Wi-Fi I/F 18 and the AP 200. This may enable the user to cause the printer 100B to perform printing through the application 38.

Effects of Case B and Case C

As described above, the terminal 10 displays a different instruction screen depending on a model name of a printer. The different instruction screens prompt the user to perform a respective different operations. Thus, the terminal 10 may display a message appropriate for a printer used by the user. Further, the user may perform an operation appropriate for the model name of the printer, thereby causing the printer to serve as a parent station in a particular wireless network. Therefore, a Wi-Fi connection may be established between the terminal 10 and the printer 100A or between the terminal 10 and the printer 100B.

Effects of the Illustrative Embodiments

According to the above configuration, if the terminal 10 receives the Probe Response from the printer 100A via the Wi-Fi I/F 18 in response to transmitting the Probe Request to the printer 100A (T44 in FIG. 2), the terminal 10 establishes a Wi-Fi connection with a target printer via the Wi-Fi I/F 18 (T58). On the other hand, if the terminal 10 does not receive the Probe Response from the printer 100A via the Wi-Fi I/F 18 in response to transmitting the Probe Request to the printer 100A (FIG. 5), the terminal 10 causes the display unit 114 to display the first instruction screen (T252 in FIG. 5). The user may thus perform the operation on the printer 100A in accordance with the instruction indicated on the first instruction screen, thereby causing the printer 100A to serve as a parent station in a particular wireless network. In a case where the printer 100A serves as a parent station, a Wi-Fi connection may be established between the terminal 10 and the printer 100A in the particular wireless network. That is, although the terminal 10 does not receive the Probe Response from the printer 100A, the terminal 10 may establish a Wi-Fi connection with the printer 100A.

If the terminal 10 does not receive the Probe Response from the printer 100B via the Wi-Fi I/F 18 in response to transmitting the Probe Request to the printer 100B (FIG. 6), the terminal 10 causes the display unit of the printer 100B to display the second instruction screen (T352 in FIG. 6). The user may thus perform the operation on the printer 100B in accordance with the instruction indicated on the second instruction screen, thereby causing the printer 100B to serve as a parent station in a particular wireless network. In a case where the printer 100B serves as a parent station, a Wi-Fi connection may be established between the terminal 10 and the printer 100B in the particular wireless network. That is, although the terminal 10 does not receive the Probe Response from the printer 100B, the terminal 10 may establish a Wi-Fi connection with the printer 100B.

Correspondences

The NFC I/F 16 is an example of a "first interface". The Wi-Fi I/F 18 is an example of a "second interface". The display unit 14 is an example of an "output unit". Each of the printer 100A and the printer 100B is an example of a "communication device". The MAC address is an example of "identification information". Each of the SSID "SETUP-NFC-MACpr1" and the SSID "SETUP-NFC-MACpr2" is an example of "first transmission destination information". The Probe Request transmitted in each of T42 of FIG. 2, T242 of FIG. 5, and T342 of FIG. 6 is an example of a "first request signal". The Probe Response received in T44 of FIG. 2 is an example of a "first response signal". The Wi-Fi connection established in T58 of FIG. 3 is an example of a "first wireless connection". Each of the operation of the Wi-Fi button in T260 of FIG. 5 and the operation of the Wi-Fi icon in T360 of FIG. 6 is an example of a "specific operation". Each of the message included in the first instruction screen of T252 of FIG. 5 and the message included in the second instruction screen of T352 of FIG. 6 is an example of "specific information". The SSID "SETUP-*-*" is an example of "second destination information". The Probe Request transmitted in each of T274 of FIGS. 5 and T374 of FIG. 6 is an example of a "second request signal". The Probe Response received in each of T276 of FIGS. 5 and T376 of FIG. 6 is an example of a "second response signal". The Wi-Fi connection established in T58 of FIG. 3 that is referred to in FIGS. 5 and 6 is an example of a "second wireless connection". The second setup operation performed in each of T270 of FIGS. 5 and T370 of FIG. 6 is an example of a "transmission operation". Each of the SSID "SETUP-NFC-MACpr1" and the SSID "SETUP-NFC-MACpr2" is an example of a "first SSID". The SSID "SETUP-*-*" is an example of a "second SSID". The parent station that is the printer 100A serving as the hidden Soft AP is an example of a "first parent station". The parent station that is the printer 100A serving as the normal Soft AP is an example of a "second parent station". The Wi-Fi connection established between the terminal 10 and the AP 200 is an example of a "third wireless connection". Each of the SSID "AP1" and the password "PW1" transmitted in T80 of FIG. 4 is an example of "establishment information". The operation of the Wi-Fi button in T260 of FIG. 5 is an example of a "first operation". The operation of the Wi-Fi icon in T360 of FIG. 6 is an example of a "second operation".

Although specific examples of the technique disclosed herein have been described in detail above, these are merely examples and do not limit the scope of the claims. Various modifications and changes of the specific examples described above are included in the technique described in the claims. Modifications of the embodiment described above will be described below.

Modification 1

In Case B of FIG. 5, the terminal 10 may execute the processing in T272 and its subsequent steps without detecting the second setup operation performed by the user. For example, in response to elapse of a certain time period after the first instruction screen is displayed on the display unit 14, the terminal 10 may execute the processing in T272 and its subsequent steps. The certain time period is, for example, one minute.

Modification 2

The "first destination information" and the "second destination information" may be a MAC address instead of an SSID.

Modification 3

If the Wi-Fi I/F 18 of the terminal 10 is capable of establishing wireless connections with two different devices respectively at the same time, the processing in T54 of FIG. 3 and the processing in T110 to T116 of FIG. 4 may be omitted.

Modification 4

The processing in T80 of FIG. 4 may be omitted.

Modification 5

The same information may be included in all the instruction screens regardless of model names of printers. In this modification, the instruction screen may preferably include a message prompting the user to perform an operation for enabling the printer to serve as a parent station in a wireless network.

Modification 6

In T34 of FIG. 2, the terminal 10 may receive a series name of the printer 100A or information indicating the presence or absence of the Wi-Fi button in the printer 100A instead of the model name "MN1" of the printer 100A. In one example, the terminal 10 may display, on the display unit 14, different instruction screens including different contents, respectively, based on the series name of the printer 100A. The different contents may prompt the user to perform respective different operations. In another example, the terminal 10 may display, on the display unit 14, different instruction screens including different contents, respectively, based on the presence or absence of the Wi-Fi button in the printer 100A. The different contents may prompt the user to perform respective different operations.

Modification 7

The "first interface" may be, for example, a Bluetooth I/F, a camera or a touch screen instead of the NFC I/F 16. Bluetooth is a registered trademark of Bluetooth SIG.

Modification 8

The "identification information" may be, for example, an identification number of a printer or a printer name instead of a MAC address.

Modification 9

The "output unit" may be, for example, a speaker instead of the display unit 14.

Modification 10

In T34 of FIG. 2, the terminal 10 may receive, from the printer 100A, function information indicating whether the printer 100A is capable of executing the first setup. In this case, in Case A of FIG. 2, the function information indicates that the printer 100A is capable of executing the first setup, and the terminal 10 thus executes the processing in T40 and its subsequent steps. If the function information indicates that the printer 100A is not capable of executing the first setup, the terminal 10 may display a screen including a message prompting the user to perform the second setup operation instead of executing the processing in T40 and its subsequent steps.

Modification 11

In the illustrative embodiments, the processing in each step of FIGS. 2 to 6 is realized by software (e.g., the OS program 36, the application 38, and the program 136). Nevertheless, in other modifications, the processing in at least one of the steps may be realized by hardware such as a logic circuit.

The technical elements described in the present specification or the drawings exhibit technical usefulness alone or in various combinations, and are not limited to the combinations described in the claims at the time of filing. The techniques illustrated in the present specification or the drawings may achieve multiple objects simultaneously, and has technical utility by achieving one of the objects.

What is claimed is:

1. A terminal comprising:
a first interface;
a second interface configured to enable the terminal to perform wireless communication, the second interface being different from the first interface;
an output unit; and
a controller configured to perform:
receiving, via the first interface, identification information for identifying a communication device, the communication device being configured for serving as a first software access point (first Soft AP) and a second software access point (second Soft AP);

in response to receiving the identification information, transmitting a first request signal to the communication device via the second interface, the first request signal including first destination information generated based on the identification information, the first destination information being used to establish a wireless network in a case where the communication device serves as the first Soft AP, where second destination information is used to establish a wireless network in a case where the communication device serves as the second Soft AP;
in response to receiving a first response signal as a response to the first request signal from the communication device via the second interface, establishing, via the second interface, a first wireless connection between the terminal and the communication device where the communication device serves as the first Soft AP; and
in response to not receiving the first response signal as a response to the first request signal from the communication device, causing the output unit to output specific information, the specific information indicating a request for performance of a specific operation on the communication device, the specific operation being for causing the communication device to serve as the second Soft AP.

2. The terminal according to claim 1,
wherein the controller is further configured to perform:
subsequent to causing the output unit to output the specific information, transmitting a second request signal to the communication device via the second interface, the second request signal including the second destination information different from the first destination information, and
in response to receiving a second response signal from the communication device after transmitting the second request signal, establishing, via the second interface, a second wireless connection between the terminal and the communication device.

3. The terminal according to claim 2,
wherein the transmitting the second request signal comprises, in response to detecting a transmission operation on the terminal subsequent to causing the output unit to output the specific information on the output unit, broadcasting the second request signal.

4. The terminal according to claim 2,
wherein the first destination information includes a first SSID, and
wherein the second destination information includes a second SSID different from the first SSID.

5. The terminal according to claim 4,
wherein the first SSID is information identifying a first wireless network in which the communication device serves as a the first Soft AP, and
wherein the second SSID is information identifying a second wireless network in which the communication device serves as the second Soft AP.

6. The terminal according to claim 5,
wherein the communication device is configured to, in a case where the communication device serves as the first Soft AP, perform:
in response to receiving a request signal including the first SSID, transmitting a response signal to a device from which the request signal including the first SSID is transmitted; and in response to receiving a request signal not including an SSID, not transmitting a response signal to a device from which the request signal not including the SSID is transmitted.

7. The terminal according to claim 2, wherein the controller is further configured to perform:

in response to receiving the first response signal from the communication device in a case where the terminal has been established a third wireless connection with an access point, disconnecting the third wireless connection, and wherein the first wireless connection is established in response to disconnecting the third wireless connection.

8. The terminal according to claim 7, wherein the controller is further configured to:

in response to establishing the first wireless connection between the terminal and the communication device, transmitting establishment information to the communication device via the second interface through the first wireless connection, the establishment information being to be used for establishing a wireless connection between the communication device and the access point.

9. The terminal according to claim 1, wherein the specific operation is:

a first operation in a case where the communication device is a first type of communication device; and a second operation in a case where the communication device is a second type of communication device different from the first type of communication device, the second operation being different from the first operation.

10. The terminal according to claim 1, wherein the first interface is configured to enable the terminal to perform wireless communication.

11. The terminal according to claim 1, wherein the identification information includes a MAC address of the communication device.

12. A non-transitory computer-readable storage medium storing computer-readable instructions executed by a controller of a terminal, the terminal comprising:

a first interface;

a second interface configured to enable the terminal to perform wireless communication, the second interface being different from the first interface; and an output unit, wherein the instructions, when executed by the controller of the terminal, causing the terminal to perform:

receiving, via the first interface, identification information for identifying a communication device, the communication device being configured for serving as a first software access point (first Soft AP) and a second software access point (second Soft AP);

in response to receiving the identification information, transmitting a first request signal to the communication device via the second interface, the first request signal including first destination information generated based on the identification information, the first destination information being used to establish a wireless network in a case where the communication device serves as the first Soft AP, where second destination information is used to establish a wireless network in a case where the communication device serves as the second Soft AP;

in response to receiving a first response signal as a response to the first request signal from the communication device via the second interface, establishing, via the second interface, a first wireless connection between the terminal and the communication device where the communication device serves as the first Soft AP; and in response to not receiving the first response signal as a response to the first request signal from the communication device, causing the output unit to output specific information, the specific information indicating a request for performance of a specific operation on the communication device, the specific operation being for causing the communication device to serve as the second Soft AP.

13. A method executed by a terminal, the terminal comprising:

a first interface;

a second interface configured to enable the terminal to perform wireless communication, the second interface being different from the first interface; and an output unit, the method comprising:

receiving, via the first interface, identification information for identifying a communication device, the communication device being configured for serving as a first software access point (first Soft AP) and a second software access point (second Soft AP);

in response to receiving the identification information, transmitting a first request signal to the communication device via the second interface, the first request signal including first destination information generated based on the identification information, the first destination information being used to establish a wireless network in a case where the communication device serves as the first Soft AP, where second destination information is used to establish a wireless network in a case where the communication device serves as the second Soft AP;

in response to receiving a first response signal as a response to the first request signal from the communication device via the second interface, establishing, via the second interface, a first wireless connection between the terminal and the communication device where the communication device serves as the first Soft AP; and in response to not receiving the first response signal as a response to the first request signal from the communication device, causing the output unit to output specific information, the specific information indicating a request for performance of a specific operation on the communication device, the specific operation being for causing the communication device to serve as the second Soft AP.

14. The terminal according to claim 1, wherein the first Soft AP is a hidden Soft AP where the first destination information is private, and wherein the second Soft AP is where the second destination information is public.

15. A terminal comprising:

a first interface;

a second interface configured to enable the terminal to perform wireless communication, the second interface being different from the first interface;

an output unit; and a controller configured to perform:

receiving, via the first interface, identification information for identifying a communication device;

in response to receiving the identification information, transmitting a first request signal to the communication device via the second interface, the first request signal including first destination information generated based on the identification information, where the first destination information includes a first SSID identifying a first wireless network in which the communication device serves as a first parent station;

in response to receiving a first response signal as a response to the first request signal from the communication device via the second interface, establishing, via the second interface, a first wireless connection between the terminal and the communication device;

in response to not receiving the first response signal as a response to the first request signal from the communication device, causing the output unit to output specific information, the specific information indicating a request for performance of a specific operation on the communication device, the specific operation being for causing the communication device to serve as a second parent station in a wireless network;

subsequent to causing the output unit to output the specific information, transmitting a second request signal to the communication device via the second interface, the second request signal including second destination information different from the first destination information, where the second destination information includes a second SSID identifying a second wireless network in which the communication device serves as the second parent station, the second SSID being different from the first SSID; and in response to receiving a second response signal from the communication device after transmitting the second request signal, establishing, via the second interface, a second wireless connection between the terminal and the communication device.

16. A terminal comprising:

a first interface;

a second interface configured to enable the terminal to perform wireless communication, the second interface being different from the first interface;

an output unit; and a controller configured to perform:

receiving, via the first interface, identification information for identifying a communication device;

in response to receiving the identification information, transmitting a first request signal to the communication device via the second interface, the first request signal including first destination information generated based on the identification information;

in response to receiving a first response signal as a response to the first request signal from the communication device via the second interface, in a case where the terminal has been established a third wireless connection with an access point, disconnecting the third wireless connection and establishing, via the second interface, a first wireless connection between the terminal and the communication device, wherein the first wireless connection is established in response to disconnecting the third wireless connection;

in response to not receiving the first response signal as a response to the first request signal from the communication device, causing the output unit to output specific information, the specific information indicating a request for performance of a specific operation on the communication device, the specific operation being for causing the communication device to serve as a parent station in a wireless network;

subsequent to causing the output unit to output the specific information, transmitting a second request signal to the communication device via the second interface, the second request signal including second destination information different from the first destination information, and in response to receiving a second response signal from the communication device after transmitting the second request signal, establishing, via the second interface, a second wireless connection between the terminal and the communication device.

* * * * *